United States Patent [19]

Roberts, Jr.

[11] Patent Number: 4,654,994

[45] Date of Patent: Apr. 7, 1987

[54] CRAPPIE FISHING ROD

[76] Inventor: William A. Roberts, Jr., P.O. Box 172, Lexington, Tenn. 38351

[21] Appl. No.: 827,646

[22] Filed: Feb. 10, 1986

[51] Int. Cl.$^4$ .............................................. A01K 91/02
[52] U.S. Cl. ........................................ 43/19; 43/18.1
[58] Field of Search ................... 43/6, 18.1, 18.5, 19, 43/23, 25

[56] References Cited

U.S. PATENT DOCUMENTS

| 2,225,719 | 12/1940 | Shotton | 43/19 |
| 2,823,482 | 2/1958 | Kremski | 43/19 |
| 2,932,111 | 4/1960 | Kremski et al. | 43/19 |
| 3,279,115 | 10/1966 | Worsham | 43/19 |
| 3,416,256 | 12/1968 | Blocker | 43/19 |
| 3,494,061 | 2/1970 | Pool | 43/19 |
| 3,828,459 | 8/1974 | Easom | 43/19 |

Primary Examiner—M. Jordan
Attorney, Agent, or Firm—Pitts and Brittian

[57] ABSTRACT

A fishing rod unit for use particularly in areas of thick vegetation. The specific device is an attachment for fishing rods and, in particular, a fishing rod combination wherein the fishing line passes along the central axis of hollow components. The attachment is a hollow elongated body having an internal diameter sufficient to accept a conventional float carried by the fishing line. The length of this body is sufficient to encase the float, a weight and the bait. Tension on the fishing line causes the float, when within the body of the attachment, to compress a coiled spring within the base thereof. The extreme end of the body carries an enlarged portion that assists a fisherman in the passing of the rod through thick vegetation. Since there is no portion of the line, or the attachments thereto, exposed to the vegetation, entanglement with the vegetation is prevented. When tension on the line is released, the spring urges the float and other components out of the body of the attachment so that fishing can commence.

6 Claims, 3 Drawing Figures

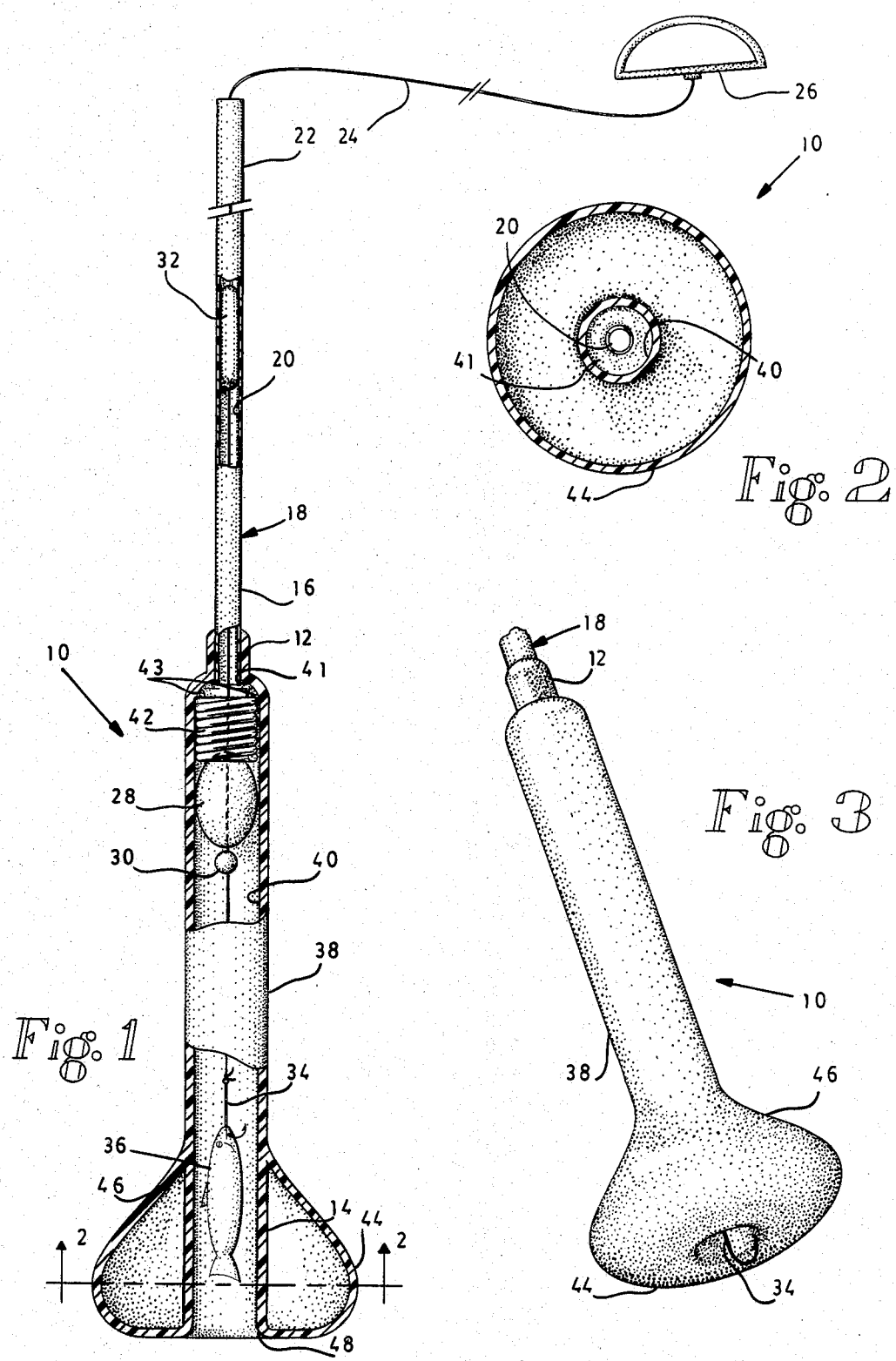

CRAPPIE FISHING ROD

DESCRIPTION

1. Technical Field

This invention relates to specialized fishing poles and more particularly to an improvement in poles known as "Crappie Poles" wherein provision is made to facilitate use of such poles along the banks of lakes and streams where vegetation is heavy.

2. Background of the Invention

Many types of specialized poles have been developed for various types of fishing. These include casting rods, spinning rods, fly-casting rods, etc. One of these specialized rods is known as a "crappie rod" for it is designed especially for use when fishing for crappie bass. This particular type of rod is stiff, and has a hollow central channel for accepting the passage of the fishing line. One end of the rod may be provided with a handle and with means for winding of the line, and the other end may have a guide to protect the line during fishing. The specific design has evolved for fishing along the banks of lakes and streams, especially during high water in the spring when crappie are often in shallow water for spawning.

For this type of fishing, the fisherman often walks along the shore searching for the best concentration of fish. A frequent problem, however, is the presence of thick vegetation along the bank that limits the fisherman's approach. Thus, the fisherman must project the rod through this vegetation so as to drop the bait into the water. Since a float and a weight are also generally used, the portion of the line having these items and the bait often becomes entangled in the vegetation. It is not infrequent that all of these items are lost so that the fisherman must re-rig the line.

One attempt at a solution of the entangling problem is addressed in U.S. Pat. No. 655,363, issued to F. J. Ditchey on Aug. 7, 1900. The device of that patent provides for a removable clamp unit at the extremity of the pole so that the line can be clamped while the pole is pushed through the vegetation. The line is exterior to the rod, and an operator wire passes along the axis of the rod to operate the clamp. However, any attachments to the line (bait, float, weight, etc.) are exposed for possible entanglement.

Two devices that have been developed to eliminate a swinging casting motion, and thus facilitate use of a fishing rod in close spaces (including around vegetation), are shown and described in U.S. Pat. Nos. 2,932,111 issued to A. Kremski, et al., on April 12, 1960, and 3,400,480, to L. A. Worsham on Sept. 10, 1968. In both of these devices, a spring mechanism within the handle portion of the rod causes an outer portion of the rod to be suddenly projected outwardly. Both have a type of cup or channel that contains a portion of the equipment (that having some inertia) carried by the line such that the sudden movement of the portion of the rod causes the line to be "cast" from the rod. The main portion of the line is external to the rod, as is the bait. Thus, very little protection is afforded to prevent entanglement during movement of the rod through vegetation.

Accordingly, it is a principal object of the present invention to provide an attachment for a fishing rod whereby all of the attachments to a fishing line are protected from entanglement during movement of the fishing rod through vegetation.

It is another object to provide an improved "crappie rod" for use by a fisherman in areas having thick vegetation along the banks of lakes, streams, etc., whereby all of the attachments to a fishing line are protected from entanglement during movement of the fishing rod through the vegetation.

It is a further object of the present invention to provide a fishing rod having the fishing line passing along the central axis of the rod, with means for encasing all of the attachments to the fishing line during movement of the rod through thick vegetation, and with means for releasing the equipment (bait, weight, float, etc.) when the end of the rod is projecting over the water to commence fishing.

These and other objects of the present invention will become apparent upon a consideration of the drawings and a detailed description of the invention.

SUMMARY OF THE INVENTION

In accordance with the present invention, there is provided an attachment for a hollow core fishing rod wherein the fishing line passes through that core. This attachment is received upon the conventional tip of the fishing rod and is in the form of a hollow cylinder having a bore sized to receive a fishing float. This bore contains a compressible coiled spring acted upon by the fishing float whereby when the float is fully withdrawn into the bore, the spring is compressed such that, upon release of line tension, the spring causes the float to be ejected out of the bore. Furthermore, the bore is of sufficient length to accommodate the fishing weight and a bait such as a minnow (real or artificial).

BRIEF DESCRIPTION OF THE DRAWINGS

FIG. 1 is a side view, partially cut away, of a fishing rod embodying the principle of the present invention.

FIG. 2 is a transverse cross-section, taken at 2—2 of FIG. 1, of the enlarged end portion of the present invention.

FIG. 3 is an isometric drawing of one embodiment of an attachment to a conventional "crappie rod" for the present invention.

BEST MODE OF THE INVENTION

A preferred embodiment of the present invention is in the form of an attachment illustrated at 10 in FIGS. 1–3. Shown in FIG. 1, the attachment 10 is cut-away at a first end 12 and a second end 14. As shown, the first end 12 is adapted to internally receive an outer or forward end 16 of a substantially conventional "crappie rod" 18, this rod 18 being stiff and provided with an axial passageway 20 the entire length from the outer end 16 to a handle end 22. The rod 18 can be of any desired length, and is conventionally about four feet in length. A conventional fishing line 24 traverses the passageway 20 and either terminates at the handle end in a conventional line-holding reel (not shown) or, in this illustrated embodiment, in a ring 26 whereby the fisherman can set the hook when a fish strikes a lure or bait. Attached to the opposite end of the line 24 are a conventional float 28, a weight 30, a float stop 32 and a hook or other fish hooking element 34. Shown in phantom is a fish-shaped bait 36 although any type of lure can be utilized with the present invention.

The attachment 10 is fabricated from a housing 38, fabricated from a material similar to that of the rod 18, provided with a substantially cylindrical passageway or cavity 40. This cavity 40 is of sufficient length to encase the float 28 and the bait 36. The bore 40 is narrowed at the first end 12 of the attachment 10 as by a shoulder 41. A coiled spring 42 is contained within the bore 40 with one end contacting and secured at the shoulder 41 as with a cement such as epoxy at 43, with a free end to be contacted by the float 28. The spring 42 is choosen to have proper full compression upon applying nominal tension to the line 24 by the fisherman, but to gently expel the float 28, weight 30 and bait 36 from the cavity 40 when this tension is released. The housing 38 preferably terminates at the second end 14 in a generally doughnut- or torus-shaped enlargement 44, as illustrated. A conical extension for stiffening, as at 46, can be used if desired. This enlargement 44 assists a fisherman in threading the rod 14 (with the attachment 10) through dense vegetation and, because of cavity 40, the bait 36 and all attachments to the line 24 are protected from entanglement during this action. A rounded inner edge, as at 48, of the enlargement 44 serves as a low-friction guide for the line 24 as it is deployed, is withdrawn, or during fishing. In this embodiment, all portions of the attachment 10 are symmetrical about the axis of the bore 40 whereby any angular orientation about the axis can be utilized.

A tranverse cross-section of the enlargement 44 is shown in FIG. 2 illustrating the concentric arrangement of the preferred embodiment of the present invention. FIG. 3 is an isometric view of the attachment 10.

In the preferred embodiment just described, the attachment 10 is mounted on the end of a fishing rod 18 having a passageway 20 through which the fishing line 24 is threaded. It is within the scope of the present invention, however, that such an attachment 10 can be appropriately attached to other types of rods such as those having a line on the exterior. For such use, the attachment 10 would be mounted such that the line 24 can be fed into the bore 40 through the end 12 such that a float 28 and other line attachments can be encased within the bore 40.

Although operation of the present invention can be understood from the above-presented detailed description of an embodiment, a further description of the operation will cause all persons to understand the operation and features of the invention. This description of operation is given with regard to the embodiment of FIG. 1. A fisherman will rig the unit of FIG. 1 by installing the attachment 10 to the extreme end 16 of the crappie rod 18, with the line 24 already threaded through the axial passageway 20. The line is passed along the bore 40 such that the float stop 32, float 28, weight 30 and hook 34 can be attached. The appropriate bait 36 can then be placed on the end of the line. The bait 36, weight 30, float 28 and float stop 32 are then withdrawn into the bore 40 (and passageway 20) by applying tension on the line 24 as by pulling on the line with the ring 26. This action causes the float to contact and compress the spring 42 into the position as illustrated. The line 24 can then be fastened in any appropriate manner at end 22 of the rod 18 so that the spring 42 remains compressed and the line attachments are confined within the bore 40.

In this position, the fisherman can move along the shore of a lake, stream or the like to a position where fishing is desired. If vegetation is dense, the enlarged end 44 can be threaded through the vegetation until the end of the attachment projects out over the water. The line 24 is then released whereupon the spring 42 expels the float out of the bore 40 such that the bait 36 and weight 30 are dropped into the water. When a fish strikes the bait 36, a tug on the line 24 by the fisherman via ring 26 sets the hook, and further movement of the line brings in the fish.

From the foregoing detailed description, it will be recognized that a very useful and convenient fishing device has been provided. The attachment is useful for many types of fishing rods; however, in combination with a crappie rod, the device is especially useful.

While a preferred embodiment has been shown and described, it will be understood that there is no intent to limit the invention by such disclosure. Rather, it is intended to cover all modifications and alternate constructions falling within the spirit and the scope of the invention as defined in the appended claims and their equivalents.

I claim:

1. An attachment for mounting on a forward end of a crappie fishing rod, said rod provided with a fishing line threaded through a central passageway of said rod for carrying at least a float and a fish hooking element, which attachment comprises:

an elongated housing provided with a cylindrical bore symmetrical about an axis, said bore having a diameter sufficient to freely receive said float and a length to contain said float and fish hooking element, said housing having a first end for attachment to said rod with said axis aligned with said central passageway of said rod for threading said line into said bore, and a second end, said bore provided with an inwardly directed shoulder proximate said first end of said housing, said second end of said housing terminating in a radially extending symmetrical enlargement;

a coiled spring positioned within said bore, said spring having a first end to contact and be secured at said shoulder, and a free second end to contact said float when said float is within said bore; and wherein said spring has a selected strength whereby tension applied to said line, with said float in contact with said second end of said spring, causes complete compression of said spring, and when tension on said line is released, causes release of said float and fish hooking element from said bore.

2. The attachment of claim 1 wherein said enlargement on said housing at said second end is torus-shaped.

3. A crappie fishing rod unit for use by a fisherman and provided with a fishing line for carrying at least a float and a fish hooking element, which unit comprises;

a fishing rod having a handle end and a forward end, said rod provided with an axial passageway from said handle end to said forward end for receiving said fishing line;

an elongated housing provided with a cylindrical axial bore having a diameter sufficient to freely receive said float and a length to contain said float and fish hooking element, said housing having a first end attached to said forward end of said rod with said bore in alignment and communication with said passageway, and a second end, said bore provided with an inwardly directed shoulder proximate said first end of said housing, said second end of said housing terminating in a radially extending symmetrical enlargement;

a coiled spring positioned within said bore, said spring having a first end secured to said bore at said shoulder, and a free second end to contact said float when said float is within said bore; and wherein said spring has a selected strength whereby tension applied to said line, with said float in contact with said second end of said spring, causes complete compression of said spring, and when tension on said line is released, causes release of said float and fish hooking element from said bore.

4. The unit of claim 3 wherein said enlargement on said housing at said second end is torus-shaped.

5. The unit of claim 3 further comprising a ring member attached to said line exterior to said handle end of said rod, said ring member providing means whereby said fisherman applies or releases tension to said line.

6. A crappie fishing rod unit for use by a fisherman in regions of surface vegetation to eliminate entanglement with said vegetation while positioning said fishing rod unit for fishing, which unit comprises:

a stiff fishing rod having a handle end and a forward end, said rod provided with an axial passageway from said handle end to said forward end;

a substantially cylindrical housing having a first end attached to said forward end of said rod so as to be coaxial with said rod, and a second end, said housing provided with an axial bore from said first end to said second end, said bore communicating with said axial passageway and being provided with an inwardly directed shoulder proximate said first end;

a torus-shaped enlargement encircling said housing at said second end to facilitate movement of said rod unit through said vegetation by said fisherman;

a fishing line threaded through said passageway and said bore, said fishing line carrying at least a float and a fish hooking element at a free end;

a ring member attached to said fishing line at said handle end of said rod whereby said fisherman applies or releases tension to said line;

a coiled spring positioned within said bore and being threaded by said line, said spring having a first end to contact and be secured at said shoulder, and a free second end to contact said float when said float is within said bore;

wherein said bore of said housing has a diameter sufficient to freely receive said float, and a length sufficient to contain said float and said fish hooking element when tension is applied to said fishing line; and wherein said spring has a selected strength whereby tension applied said line, with said float in contact with said second end of said spring, causes complete compression of said spring, and when tension on said line is released, causes release of said float and fish hooking element from said bore.

* * * * *